March 13, 1962 M. MILLMAN 3,025,093
TURN LOCKS
Filed March 28, 1960
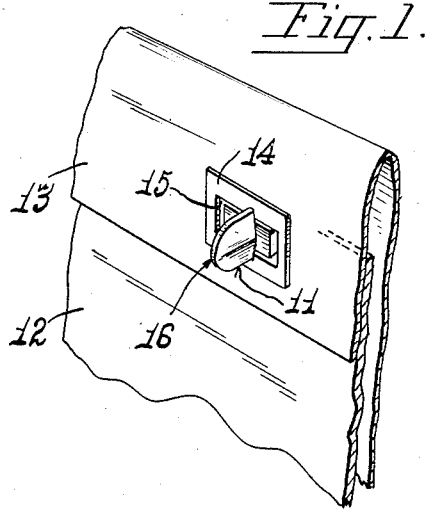
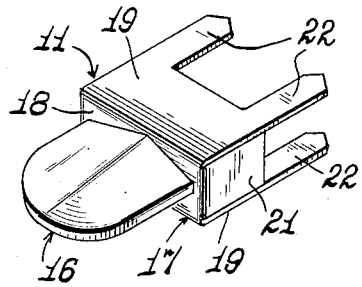
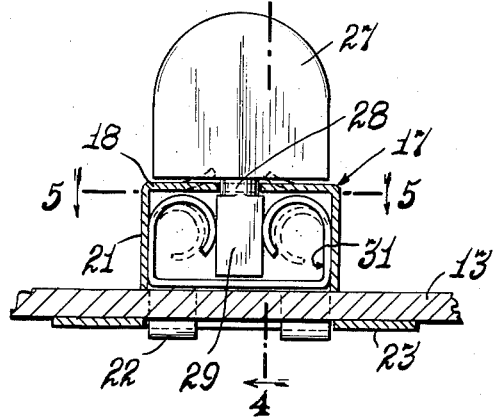
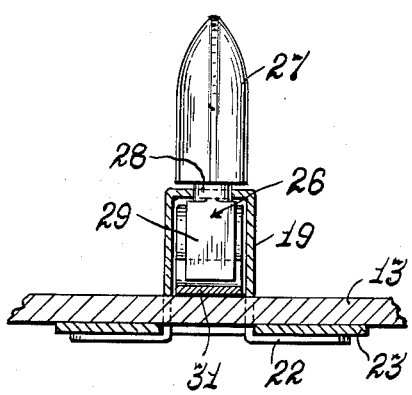
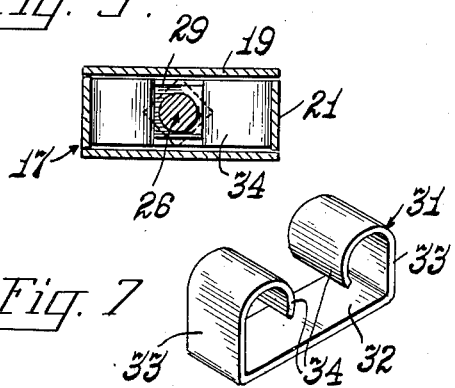
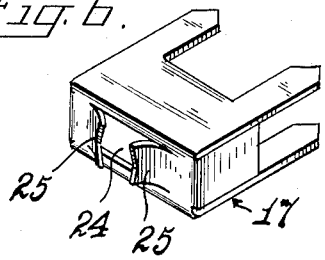
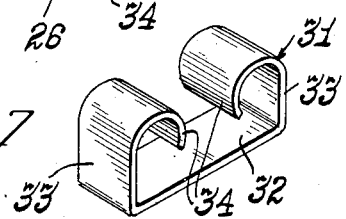
INVENTOR.
MAX. MILLMAN.
BY
Elmer L. Gwickel
Atty.

United States Patent Office 3,025,093
Patented Mar. 13, 1962

3,025,093
TURN LOCKS
Max Millman, Providence, R.I., assignor to Rau Findings Company, Providence, R.I., a corporation of Rhode Island
Filed Mar. 28, 1960, Ser. No. 17,972
1 Claim. (Cl. 292—204)

The invention relates to improvements in fastening devices and is more particularly concerned with the novel construction and assembly of a turn-lock type of fastener of a character especially useful for fastening a flap on a hand bag or the like in closed condition.

Turn-lock fasteners of the general character herein disclosed have a box like housing that is attached to the body of a bag, box or other container, and a grommet is mounted in the flap thereof and is adapted to be telescopically fitted over the housing when the flap is in closed position. The housing carries on its end a rotatable lock element which normally is positioned to permit the fitting of the grommet over the housing and then is rotated 90° on its axis to locate its ends over the grommet to prevent removal. Known types of turn-lock constructions involve the use of a coiled spring on the stem of the lock element and means on the housing to frictionally coact with the lock element to resiliently retain it in either of its positions. Such structures have the disadvantage of requiring costly assembly operations and are particularly objectionable because the lock element stem must be swedged to retain the spring thereon and anchor the lock element to the housing. Frequently the swedging gives way in use and the lock element becomes loose.

In accordance with the present invention the lock element or latching member is formed with an integral stem having a square shank portion undercut adjacent to the body or head of the member to provide a journal to permit its rotation. The body or housing is formed from sheet metal stock and has a central opening in its top wall defined on two sides by normally upwardly curved tongues affording an opening size sufficiently large to permit the square shank of the latching member to be passed therethrough during assembly. Application of sufficient pressure endwise on the latching member during such assembly presses the tongues into the plane of the top wall thus rendering the opening smaller than the cross section of the square shank but of a size to permit the shank journal to be rotatable therein. A novelly formed leaf spring is inserted in the body to coact with the square shank for positional rotation and retention of the latching member.

The present structure and assembly has many advantages not known to be present in prior known structures. The assembly requires a minimum number of parts that are easily and quickly assembled and secured in assembled position. It is rugged in its construction as compared with coil spring-swedged type assemblies because such prior assemblies tend to weaken and/or separate when subjected to excessive wear.

It is therefore an object of the invention to provide a novelly constructed turn-lock assembly.

Another object is to provide a turn-lock assembly with a novelly constructed latching element.

Another object is to provide a turn-lock assembly with a novelly constructed housing.

Still another object is to provide a turn-lock assembly with novel spring means in association with the latching element.

With the foregoing and other objects in view which will appear as the description proceeds, the invention consists of certain novel features of construction, arrangement and combination of parts hereinafter fully described, illustrated in the accompanying drawings, and particularly pointed out in the appended claim, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a fragmentary perspective view of a representative hand bag showing the novel turn-lock mounted thereon.

FIG. 2 is an enlarged perspective view of an unmounted turn-lock.

FIG. 3 is a longitudinal central sectional view of the turn-lock, showing a portion of the mounting in section.

FIG. 4 is a vertical transverse sectional view taken substantially on line 4—4 of FIG. 3, and showing the latching member in elevation.

FIG. 5 is a horizontal sectional view taken on line 5—5 of FIG. 3.

FIG. 6 is a perspective view of the housing.

FIG. 7 is a perspective view of the novel spring.

Referring to the exemplary disclosure in the accompanying drawings, the turn-lock 11 is adapted to be attached firmly to a wall 12 of a bag or other container. A flap 13 on said container is adapted to be folded into overlying relation to the wall 12 for closing the mouth of said container and said flap is provided with a grommet 14 having an opening 15 of a size and shape to telescope over the turn-lock. When the parts are so related, a latching member, generally indicated at 16, is rotated 90° so as to carry its ends into overlapping relation with the grommet to prevent its removal.

The turn-lock includes a body or housing 17 fabricated from thin shape retaining sheet metal stock into a substantially box-like configuration including a top wall 18, side walls 19 bent perpendicular to said top wall and end walls 21 extending between said side walls. The bottom of the housing is open and side walls 19 each have a pair of attaching prongs 22 that are extended through wall 12, or other supporting sheet, and then bent outwardly laterally, as shown in FIG. 4, to secure the housing to said wall. Preferably, an apertured plate 23 is arranged on the inside face of wall 12 beneath the bent over prongs to reinforce the mounting.

Top wall 18 has a central opening 24 therein (FIG. 6) bounded on two opposed sides by tongues 25 that are struck out of the material of said top wall and then curved normally upwardly outwardly therefrom. This affords a relatively large opening prior to assembly of related parts. The opening 24 is adapted to receive therethrough a shank 26 forming a part of latching member 16. As shown the latching member includes a head 27 integral with said shank. This head preferably is substantially flat and is of such size that its width is less than the width of housing 17 and its length is substantially greater than said housing width but less than the housing length so as to permit passage of the grommet 14 thereover when the locking member is in the unlatching position best shown in FIGS. 3 and 4.

The shank 26 has a generally circular journal portion 28 adjacent to the head 27 while the remainder of said shank is substantially square in section, as at 29. To assemble the locking member and housing, the shank 26 is thrust downwardly through the top wall opening 24 with sufficient force to deform the upwardly curved tongues 25 downwardly into the plane of top wall 18, as shown in full lines in FIG. 3. When this occurs, the free ends of said tongues extend into the region of journal portion 28 of shank 26 and lie behind the square shank portion 29 to prevent withdrawal of the shank.

In order to afford means to retain the latching member in its two positions of use as illustrated in FIGS. 1 and 2, novel spring means is enclosed in housing 17 for cooperation with the square shank portion 29. As best shown in FIG. 7, the spring means 31 comprises a strip of spring steel having a width slightly less than the spacing between housing side walls 19. The strip is suitably formed to provide a base portion 32 and two upstanding end portions 33. The base portion is of a length corresponding substantially to the spacing between the housing end walls 21 so that when the spring is inserted into the housing through its open bottom, it will be frictionally retained by said walls. The free ends of said spring end portions 33 are rolled over inwardly towards each other, as at 34, and are of such size as to provide a space between their most closely opposed surfaces that corresponds substantially to the thickness of the square shank portion 29 which is embraced between them when assembled.

It should be quite apparent at this time that spring 31 will coact with opposed flat sides of the shank portion 29 to retain it in its positions of selective rotatable adjustment. When the latching member is rotated on its axis, spring 31 will yield sufficiently to permit such rotation and will tend to urge the latching member into and retain it in either latching or unlatching position with respect to the grommet 14.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claim.

What I claim and desire to secure by Letters Patent of the United States is:

A fastener device comprising a box-like housing open at its bottom and having a top wall and side and end walls depending from said top wall, a rotatable latching member arranged on the outside surface of said top wall, an elongated shank integral with said latching member and projecting through an aperture in said top wall and into the interior of said housing, said shank being non-circular in section, an annular channel in said shank adjacent to said latching member defining shoulders engageable with the inside surface of the top wall to prevent withdrawal of the shank, a substantially U-shaped leaf spring of a width corresponding substantially to the spacing between the housing side walls telescoped into the open bottom of said housing with its end portions extending in the direction of said top wall, said U-shaped spring defining a bottom housing wall and having its end portions arranged in frictional engagement with the housing end walls to prevent its displacement, and opposed reversely rolled terminal portions on the free ends of said end portions yieldingly embracing opposed surfaces of the non-circular shank.

References Cited in the file of this patent

UNITED STATES PATENTS

| 152,774 | Steele | July 7, 1874 |
| 1,052,676 | Lotz | Feb. 11, 1913 |
| 1,854,730 | Bell | Apr. 19, 1932 |
| 2,414,662 | Ostrom | Jan. 21, 1947 |
| 2,613,524 | Holmsten | Oct. 14, 1952 |
| 2,651,805 | Laible | Sept. 15, 1953 |
| 2,727,220 | Buchanan et al. | Dec. 13, 1955 |

FOREIGN PATENTS

| 106,651 | Great Britain | May 29, 1917 |